United States Patent
Emori et al.

(10) Patent No.: US 8,910,069 B2
(45) Date of Patent: Dec. 9, 2014

(54) REGISTER CONFIGURATOR AND REGISTER CONFIGURATION METHOD

(75) Inventors: Toshiyuki Emori, Tokyo (JP); Yasuyuki Nakamoto, Tokyo (JP); Hideki Umemoto, Tokyo (JP); Hiroshi Mori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 911 days.

(21) Appl. No.: 13/084,886

(22) Filed: Apr. 12, 2011

(65) Prior Publication Data

US 2011/0258567 A1 Oct. 20, 2011

(30) Foreign Application Priority Data

Apr. 14, 2010 (JP) ................................. 2010-092875

(51) Int. Cl.
| | |
|---|---|
| *G06F 3/048* | (2013.01) |
| *H04L 12/28* | (2006.01) |
| *G06F 3/0484* | (2013.01) |
| *G06F 3/0486* | (2013.01) |
| *H04L 12/24* | (2006.01) |

(52) U.S. Cl.
CPC ........ *H04L 12/2807* (2013.01); *G06F 3/04847* (2013.01); *G06F 3/0486* (2013.01); *H04L 41/0803* (2013.01); *H04L 41/22* (2013.01)
USPC .......................................................... 715/769

(58) Field of Classification Search
CPC ................................................. G06F 3/04847
USPC .......................................................... 715/769
See application file for complete search history.

(56) References Cited

U.S. PATENT DOCUMENTS

| 6,067,477 | A * | 5/2000 | Wewalaarachchi et al. .... 700/83 |
| 8,605,602 | B2 * | 12/2013 | Emori et al. ................... 370/242 |
| 2003/0009253 | A1 * | 1/2003 | McIntyre et al. ............. 700/108 |
| 2004/0056888 | A1 * | 3/2004 | Fujinuma ...................... 345/736 |
| 2009/0059814 | A1 * | 3/2009 | Nixon et al. ................... 370/254 |
| 2010/0241748 | A1 * | 9/2010 | Ansari et al. .................. 709/225 |

(Continued)

FOREIGN PATENT DOCUMENTS

| EP | 2066142 A2 | 6/2009 |
| JP | 2002-007166 A | 1/2002 |
| JP | 2004-128785 A | 4/2004 |

OTHER PUBLICATIONS

European Search Report dated Aug. 10, 2011, issued in corresponding European Patent Application No. 11161964.9.

*Primary Examiner* — William Bashore
*Assistant Examiner* — Henry Orr
(74) *Attorney, Agent, or Firm* — Westerman, Hattori, Daniels & Adrian, LLP

(57) ABSTRACT

A register configurator may include a display screen, a data display unit that displays data related to field devices on the display screen, a register space display unit that graphically displays a register space of a register on the display screen, a manipulation reception unit that receives a manipulation for allocating each of the data, which has been displayed by the data display unit, to an area in the register space, which has been displayed by the register space display unit, the manipulation being performed on the display screen by a user, and a correspondence establishing unit that establishes a correspondence between the data and the area, based on the manipulation that has been received by the manipulation reception unit.

18 Claims, 6 Drawing Sheets

(56) References Cited

U.S. PATENT DOCUMENTS

| | | | |
|---|---|---|---|
| 2011/0167154 A1* | 7/2011 | Bush et al. | 709/224 |
| 2011/0172965 A1* | 7/2011 | McIntyre et al. | 702/183 |
| 2011/0258567 A1* | 10/2011 | Emori et al. | 715/769 |
| 2011/0313549 A1* | 12/2011 | Emori et al. | 700/81 |

* cited by examiner

REGISTER CONFIGURATOR AND REGISTER CONFIGURATION METHOD

BACKGROUND OF THE INVENTION

1. Field of the Invention

The present invention relates to a register configurator that establishes a correspondence between data related to field devices and a position of the data in a register that updates the data. Also, the present invention relates to a field control system including a register configurator that establishes a correspondence between data related to field devices and a position of the data in a register that updates the data. Also, the present invention relates to a register configuration method by which a correspondence between data related to field devices and a position of the data in a register that updates the data is established.

Priority is claimed on Japanese Patent Application No. 2010-092875, filed Apr. 14, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

When performing data transmission between field devices, which perform a wireless communication based on the ISA100.11a field wireless standard, and a host device, the field devices and the host device may be connected through an ISA100 wireless gateway that is based on the ISA100.11a field wireless standard. If the host device is a Modbus/TCP client, then the above data transmission can be performed through the ISA100 wireless gateway including a Modbus/TCP server and an ISA100 backbone router. The ISA100 backbone router performs the wireless communication with the field devices. The Modbus/TCP server includes a Modbus register that performs data mapping.

The field devices and the wireless gateway perform the wireless communication of Publish/Subscribe method based on the ISA100.11a field wireless standard. The ISA100 backbone router receives process data, which is output from the field devices, through the wireless communication. The Modbus/TCP server performs mapping of the received process data on the Modbus register. The Modbus/TCP client receives the process data that is mapped on the Modbus register from the Modbus/TCP server, and performs control of the field devices and so on. As described above, the process data is updated by successively mapping the process data on the Modbus register.

The area where each process data is stored is defined by a definition file. The definition file defines register mapping information that the Modbus/TCP server stores. The definition file includes a text that lists a correspondence between information that specifies each process data, data size of the process data, and a register number of the Modbus register. In an operation of a configuration by which the definition file is generated, the information of the correspondence related to many process data must be listed in a text form. Thereby, the operation of the configuration is very complicated. Errors easily occur and it is difficult to find the errors.

SUMMARY

A register configurator may include a display screen, a data display unit that displays data related to field devices on the display screen, a register space display unit that graphically displays a register space of a register on the display screen, a manipulation reception unit that receives a manipulation for allocating each of the data, which has been displayed by the data display unit, to an area in the register space, which has been displayed by the register space display unit, the manipulation being performed on the display screen by a user, and a correspondence establishing unit that establishes a correspondence between the data and the area, based on the manipulation that has been received by the manipulation reception unit.

A field control system may include field devices, a gateway that performs a wireless communication with the field devices, and a client that communicates with the field devices through the gateway, the client being connected to the gateway through a bus. The gateway may include a register that stores data related to the field devices, and a register configurator that controls the register. The register configurator may include a display screen, a data display unit that displays the data related to the field devices on the display screen, a register space display unit that graphically displays a register space of the register on the display screen, a manipulation reception unit that receives a manipulation for allocating each of the data, which has been displayed by the data display unit, to an area in the register space, which has been displayed by the register space display unit, the manipulation being performed on the display screen by a user, and a correspondence establishing unit that establishes a correspondence between the data and the area, based on the manipulation that has been received by the manipulation reception unit.

A register configuration method may include displaying data related to field devices on a display screen, graphically displaying a register space of a register on the display screen, receiving a manipulation for allocating each of the data, which has been displayed on the display screen, to an area in the register space, which has been displayed on the display screen, the manipulation being performed on the display screen by a user, and establishing a correspondence between the data and the area, based on the manipulation that has been received.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

Figure 1:
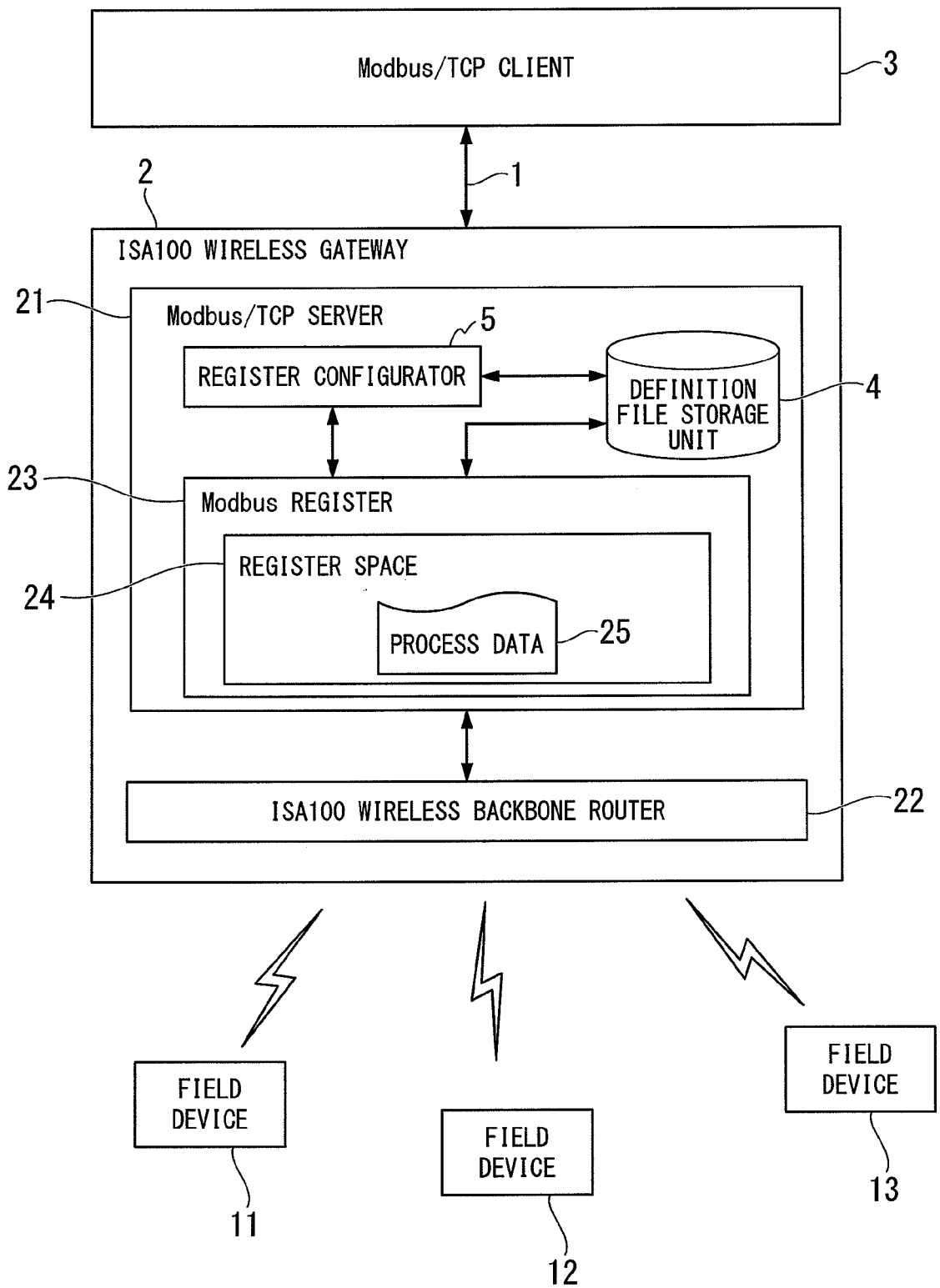
FIG. 1 is a block diagram illustrating a configuration example of a distributed field control system performing a register configuration method in accordance with a first preferred embodiment of the present invention.

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

A register configurator may include a display screen, a data display unit that displays data related to field devices on the display screen, a register space display unit that graphically displays a register space of a register on the display screen, a manipulation reception unit that receives a manipulation for allocating each of the data, which has been displayed by the data display unit, to an area in the register space, which has been displayed by the register space display unit, the manipulation being performed on the display screen by a user, and a correspondence establishing unit that establishes a correspondence between the data and the area, based on the manipulation that has been received by the manipulation reception unit.

The register space display unit may display the register space so that a first area in the register space where the data is allocated and a second area in the register space where the data is not allocated can be distinguished by the user.

The register configurator may further include an allocation display unit that displays the area in the register space where the data is allocated based on the manipulation which has been received by the manipulation reception unit.

The display screen may include a first display area where the data is displayed in a hierarchy structure, the hierarchy structure including a gateway name, a field device name, a UAP (user application) name, and a data name, a second display area where a register number is displayed, the register number corresponding to the area in the register space where the data is allocated, and a third display area where the register space is displayed graphically.

The first display area may be displayed by the data display unit, and the third display area is displayed by the register space display unit.

The register space may be displayed so that the manipulation can be performed on the display screen by a user's operation of drag and drop.

The register space display unit may display a first area in the register space where the data is allocated by using a first color, the register space display unit displaying a second area in the register space where the data is not allocated by using a second color that is different from the first color.

The correspondence between the data and the area may be automatically listed into a text file after the data is allocated to the area in the register space.

Contents of the text file may be displayed on the display screen so as to be edited by the user.

A field control system may include field devices, a gateway that performs a wireless communication with the field devices, and a client that communicates with the field devices through the gateway, the client being connected to the gateway through a bus. The gateway may include a register that stores data related to the field devices, and a register configurator that controls the register. The register configurator may include a display screen, a data display unit that displays the data related to the field devices on the display screen, a register space display unit that graphically displays a register space of the register on the display screen, a manipulation reception unit that receives a manipulation for allocating each of the data, which has been displayed by the data display unit, to an area in the register space, which has been displayed by the register space display unit, the manipulation being performed on the display screen by a user, and a correspondence establishing unit that establishes a correspondence between the data and the area, based on the manipulation that has been received by the manipulation reception unit.

The register space display unit may display the register space so that a first area in the register space where the data is allocated and a second area in the register space where the data is not allocated can be distinguished by the user.

The register configurator may further include an allocation display unit that displays the area in the register space where the data is allocated by the manipulation received by the manipulation reception unit.

A register configuration method may include displaying data related to field devices on a display screen, graphically displaying a register space of a register on the display screen, receiving a manipulation for allocating each of the data, which has been displayed on the display screen, to an area in the register space, which has been displayed on the display screen, the manipulation being performed on the display screen by a user, and establishing a correspondence between the data and the area, based on the manipulation that has been received.

The register configuration method may further include displaying the data on the display screen in a hierarchy structure, the hierarchy structure including a gateway name, a field device name, a UAP (user application) name, and a data name, and displaying a register number on the display screen, the register number corresponding to the area in the register space where the data is allocated.

The manipulation may be performed on the display screen by a user's operation of drag and drop.

The register configuration method may further include displaying a first area in the register space where the data is allocated by using a first color, and displaying a second area in the register space where the data is not allocated by using a second color that is different from the first color.

The register configuration method may further include automatically listing the correspondence between the data and the area into a text file after the data is allocated to the area in the register space.

The register configuration method may further include displaying contents of the text file on the display screen so as to be edited by the user.

The register configuration method may further include displaying the register space so that a first area in the register space where the data is allocated and a second area in the register space where the data is not allocated can be distinguished by the user.

The register configuration method may further include displaying the area in the register space where the data has been allocated based on the manipulation that has been received.

By using the register configurator and the register configuration method, manipulation that is performed on the screen so as to allocate each data to an area in the register space is received. The correspondence between the data and the area in the register space is established based on the received manipulation. Thereby, the burden for establishing the correspondence between the data and register can be reduced.

A register configuration method in accordance with a first preferred embodiment of the present invention will be described.

FIG. 1 is a block diagram illustrating a configuration example of a distributed field control system performing a register configuration method in accordance with the first preferred embodiment of the present invention.

Field devices 11, 12 and 13 are disposed in a plant that performs a wireless communication based on the ISA100.11a field wireless standard. The number of the field devices is not limited to three but may be an arbitrary number. Each of the field devices 11, 12 and 13 is connected to a Modbus/TCP client 3 through an ISA100 wireless gateway 2 that performs the wireless communication based on the ISA100.11a field wireless standard.

The ISA100 wireless gateway 2 includes a Modbus/TCP server 21 and an ISA100 backbone router 22. The ISA100 backbone router 22 performs the wireless communication with the field devices 11, 12 and 13. The Modbus/TCP server 21 includes a Modbus register 23, a register configurator 5, and a definition file storage unit 4. The ISA100 wireless gateway 2 and the Modbus/TCP client 3 are connected through, for example, a bus 1.

The field devices 11, 12 and 13 and the ISA100 wireless gateway 2 perform the wireless communication in a Publish/Subscribe manner based on the ISA100.11a field wireless standard. The ISA100 backbone router 22 receives process data that is output from the field devices 11, 12 and 13 by using the wireless communication. The Modbus/TCP server 21 maps the received process data on the Modbus register 23. The Modbus/TCP client 3 receives the process data mapped on the Modbus register 23 from the Modbus/TCP server 21 by using a Modbus/TCP protocol. The Modbus/TCP client 3 performs control of the field devices 11, 12 and 13 based on the received process data. The Modbus/TCP client 3 maps a manipulation value on the Modbus register 23 by using the Modbus/TCP protocol. The field devices 11, 12 and 13 receive the manipulation value through the backbone router 22 by using the wireless communication.

As described above, in the distributed field control system performing the register configuration method in accordance with the first preferred embodiment of the present invention, the process data and the manipulation value are mapped on the Modbus register 23. Thereby, data that is a target of the communication is updated.

Figure 2:
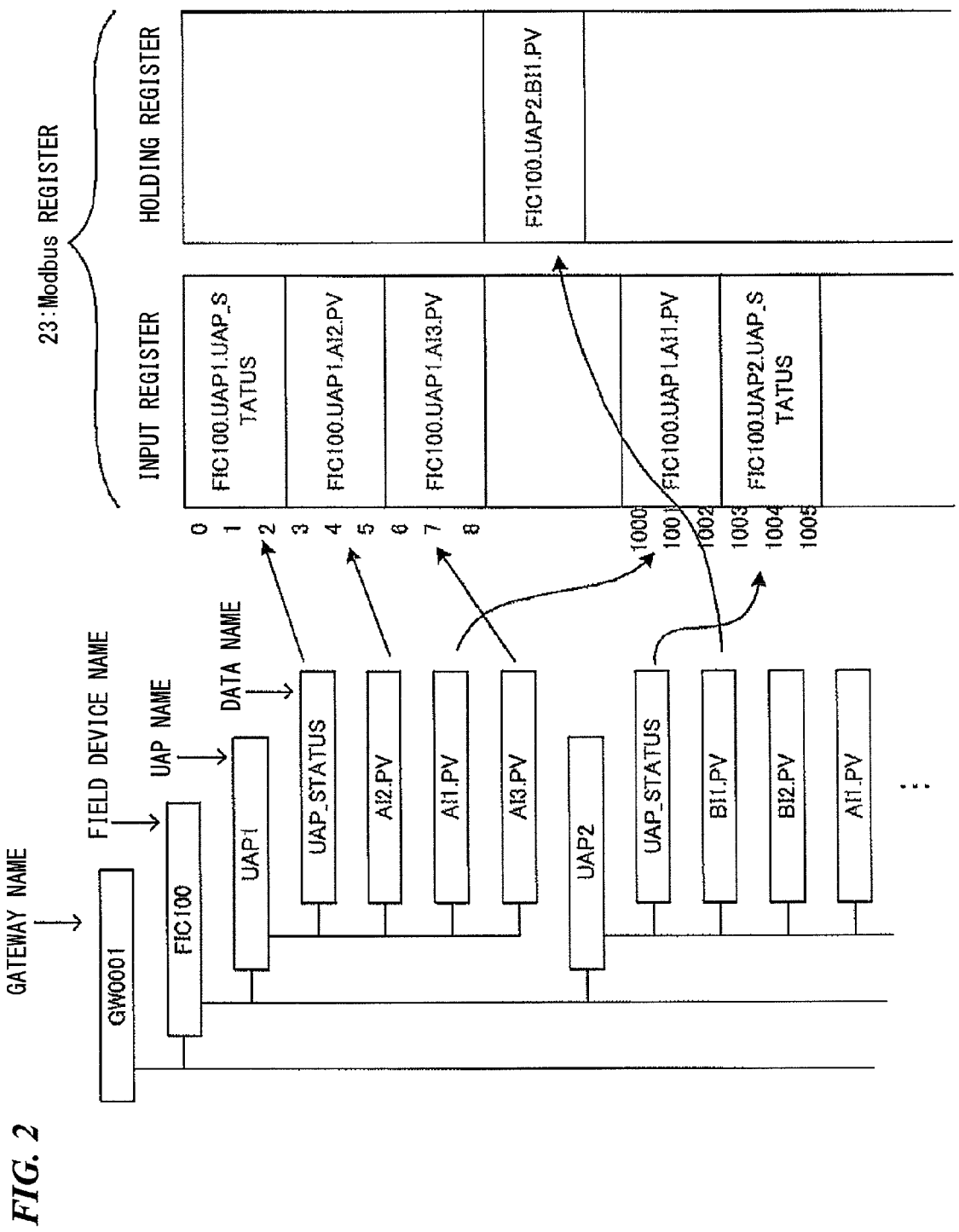
FIG. 2 is a view illustrating an example of a correspondence between a register number of a Modbus register and data related to a field device.

FIG. 2 is a view illustrating an example of a correspondence between a register number of the Modbus register 23 and data related to the field devices 11, 12 and 13. The correspondence is defined beforehand by a definition file. The definition file defines mapping information of the Modbus register 23. As illustrated in FIG. 2, the Modbus register 23 includes an input register and a holding register. The input register is used to store the process data received from the filed devices 11, 12 and 13. The holding register is used to store the manipulation value received from the Modbus/TCP client 3 etc. The input register is used for reading only. The holding register is used for reading/writing.

As illustrated in FIG. 2, the data such as the process data and the manipulation value, which are treated in the field devices 11, 12 and 13, is expressed in a hierarchy structure that arranges a gateway name, a field device name, a UAP (user application) name, and a data name in series.

For example, the process data specified by the gateway name "GW0001" that corresponds to the ISA100 wireless gateway 2, the field device name "FIC100", the UAP name "UAP1", and the data name "UAP_STATUS" is expressed as "GW0001.FIC100.UAP1.UAP_STATUS". The data is made to correspond to the area of the register numbers 0 to 2 in the input register.

Similarly, the data that is expressed as "GW0001.FIC100.UAP1.A12 PV" is made to correspond to the area of the register numbers 3 to 5 in the input register.

The correspondence between the data and the register number is defined by the definition file stored in the definition file storage unit 4 of the Modbus/TCP server 21. The definition file is a text file that lists the correspondence between the data and the register number.

Figure 3:
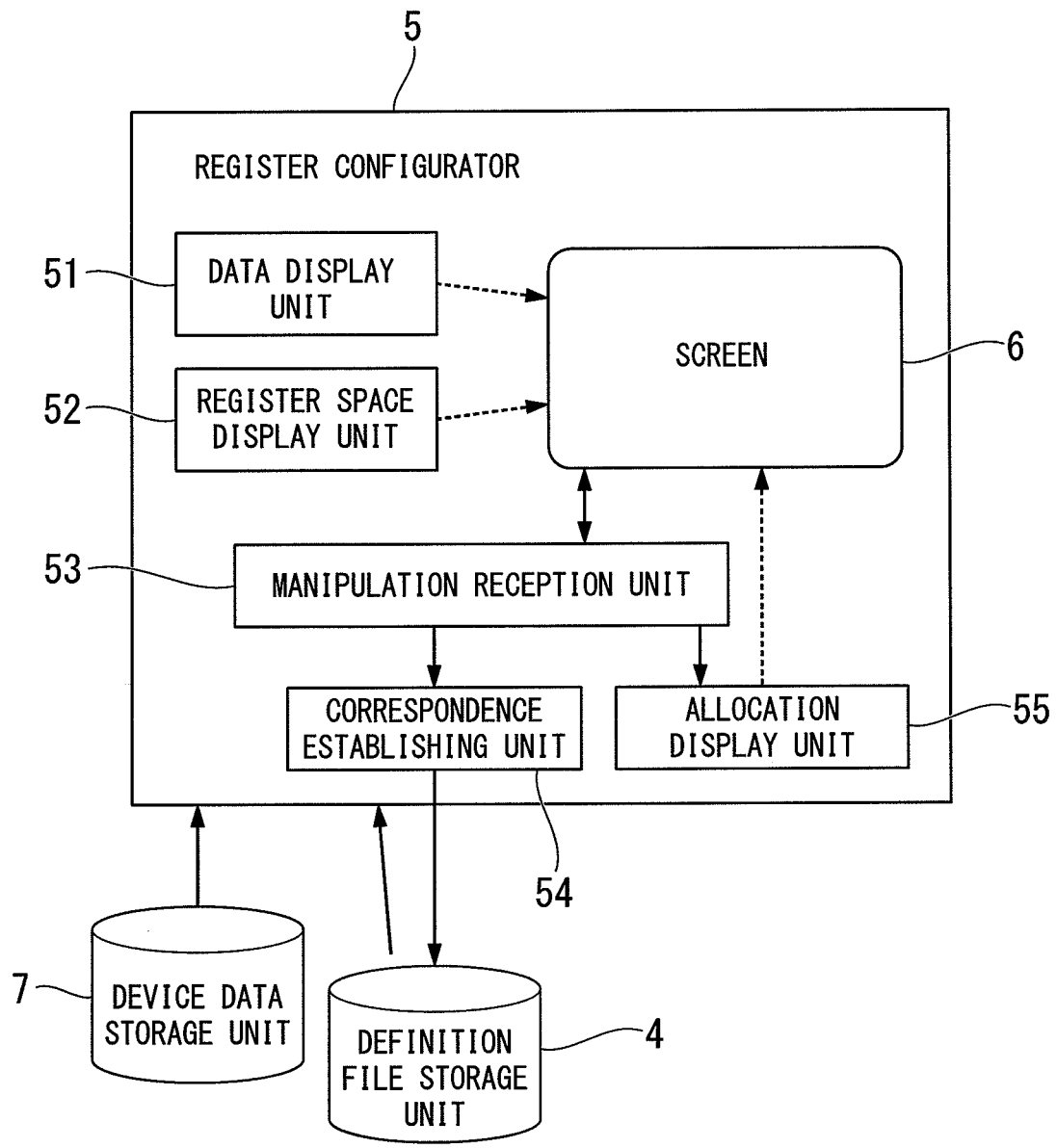
FIG. 3 is a block diagram illustrating a configuration example of a register configurator in accordance with the first preferred embodiment of the present invention.

FIG. 3 is a block diagram illustrating a configuration example of the register configurator 5 in accordance with the first preferred embodiment of the present invention. The register configurator 5 establishes the correspondence between the data related to the field devices 11, 12 and 13 and the register number in the Modbus register 23.

As illustrated in FIG. 3, the register configurator 5 includes a data display unit 51, a register space display unit 52, a manipulation reception unit 53, a correspondence establishing unit 54, and an allocation display unit 55. The data display unit 51 displays the data related to the field devices 11, 12 and 13 on a screen 6. The register space display unit 52 graphically displays the register space of the Modbus register 23 on the screen 6. The manipulation reception unit 53 receives the manipulation performed on the screen 6 by a user. The correspondence establishing unit 54 establishing the correspondence between the data and the area in the register space based on the manipulation by the user that is received by the manipulation reception unit 53. The allocation display unit 55 displays on the screen 6 the area in the register space that the data is allocated to by the manipulation received by the manipulation reception unit 53.

As illustrated in FIG. 3, the register configurator 5 can access a device data storage unit 7 that stores device data. The device data defines the data size etc. of the data such as the process data and the manipulation value that are treated in the field devices 11, 12 and 13.

Next, operation of the register configurator 5 will be described using FIGS. 3 to 6.

Figure 4:
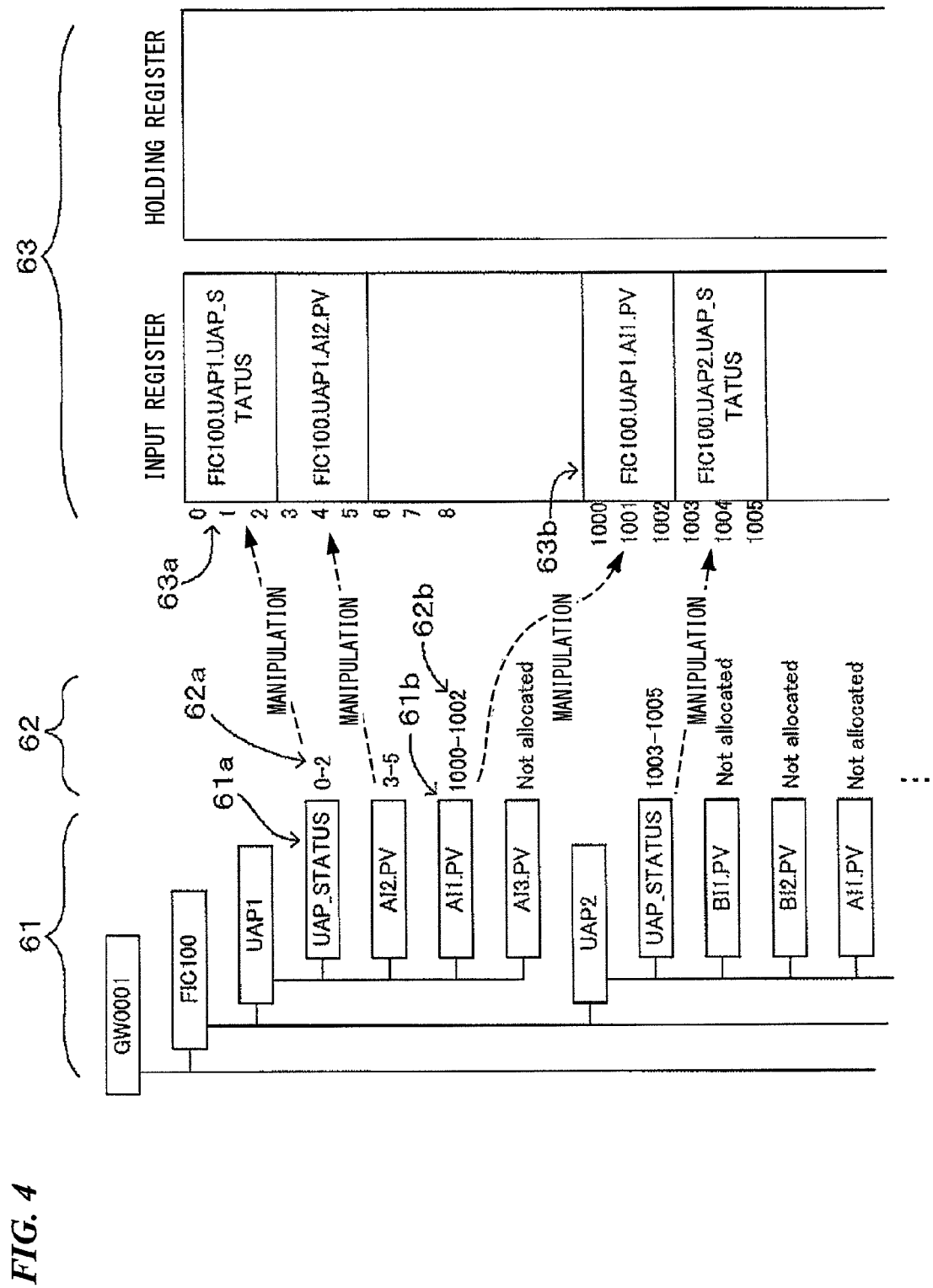
FIG. 4 is a view illustrating an example of a display in a screen of the register configurator in accordance with the first preferred embodiment of the present invention.

FIG. 4 is a view illustrating an example of a display in the screen 6 of the register configurator 5.

As illustrated in FIG. 4, the display in the screen 6 includes display areas 61, 62 and 63. The display area 61 displays the hierarchy structure, which arranges the gateway name, the field device name, the UAP name, and the data name in series, of the data such as the process data and the manipulation value that are treated in the field devices 11, 12 and 13. The display area 62 displays the register number in the Modbus register 23 that each data displayed on the display area 61 is allocated to. The display area 63 graphically displays the register space of the Modbus register 23. As illustrated in FIG. 4, the register number is attached to the register space displayed on the display area 63. Thereby, the correspondence between the position of the data in the register space and the register number can be recognized.

The operation of displaying the display area 61 corresponds to the function of the data display unit 51. The operation of displaying the display area 63 corresponds to the function of the register space display unit 52.

The user selects a data name displayed on the display area 61, and moves the data name to the register space displayed on the display area 63 by an operation of drag and drop. Thereby, the data of the data name is allocated to a prescribed area in the register space. The above operation in the register configurator 5 corresponds to the function of the manipulation reception unit 53.

For example, in FIG. 4, if a data name 61a that corresponds to a process data "GW0001.FIC100.UAP1.UAP_STATUS" is moved to an area 63a in the register space, then the process data is allocated to register numbers 0 to 2 in the input register that corresponds to the area 63a. Similarly, if a process data "GW0001.FIC100.UAP1.A11_PV" is moved to an area 63b in the register space, then the process data is allocated to register numbers 1000 to 1002 in the input register that corresponds to the area 63b.

The register configurator 5 can recognize the data size of the data such as the process data and the manipulation value, which are treated in the field devices 11, 12 and 13, based on the device data that are defined beforehand. When the data is allocated to the register space, the data is allocated to the area that is suitable to the data size of the data.

After the data is allocated to the register space, display box, which the data name of the data is attached to, is displayed on an area of the corresponding register number in the register space of the display area 63. Thereby, it is shown that the data of the data name is allocated to the area in the register space. Also, the register number of the area, which the data is allocated to, is displayed on an area neighbor to the area of the data name in the display area 62. For example, the display box of the data "GW0001. FIC100.UAP1.UAP_STATUS" is displayed in the display area 63a. The register numbers 0-2, which the data is allocated to, are displayed in the display area 62a. Similarly, the display box of the data "GW0001.FIC100.UAP1.ALL_PV" is displayed in the display area 63b. The register numbers 1000-1002, which the data is allocated to, are displayed in the display area 62b. The above displaying operation corresponds to the function of the allocation display unit 55.

The area in the register space, which the data is allocated to, may be displayed by using other colors so as to be recognized clearly.

The register number of the area, which the data is allocated to, may be changed after the data is once allocated to the area in the register space. In this case, if the display box of the data, which is allocated to the register space in the display area 63, is moved in the register space by an operation of drag and drop, then the data is allocated to the area of the register number in the input register that corresponds to the area that the display box is moved to.

The area that the data is allocated to is arbitrary. Even if there is an area that the data is not allocated to, it is no problem. The area that the data is allocated to and the area that the data is not allocated to can be distinguished by the display on the screen 6.

After all data are allocated to the register space, the correspondence establishing unit 54 can establish correspondence between the data and the register number. The register configurator 5 automatically converts the correspondence to a text file, to generate the definition file. The definition file is stored in the definition file storage unit 4 in the Modbus/TCP server 21. The definition file is used to refer the register number of the area where the data is stored in the Modbus/TCP server 21.

The contents of the definition file can be displayed on the screen 6 of the register configurator 5, and can be edited by using the screen 6. The contents of the definition file are displayed as the display screen illustrated in FIG. 4, by the data display unit 51 and the register space display unit 52. By operating the display screen, the user can edit the contents of the definition file. The result of the editing is reflected on the definition file by automatically being converted to a text file. The edited definition file is stored in the definition file storage unit 4 in the Modbus/TCP server 21, and each data is mapped on the register space based on a new correspondence written in the edited definition file.

Figure 5:
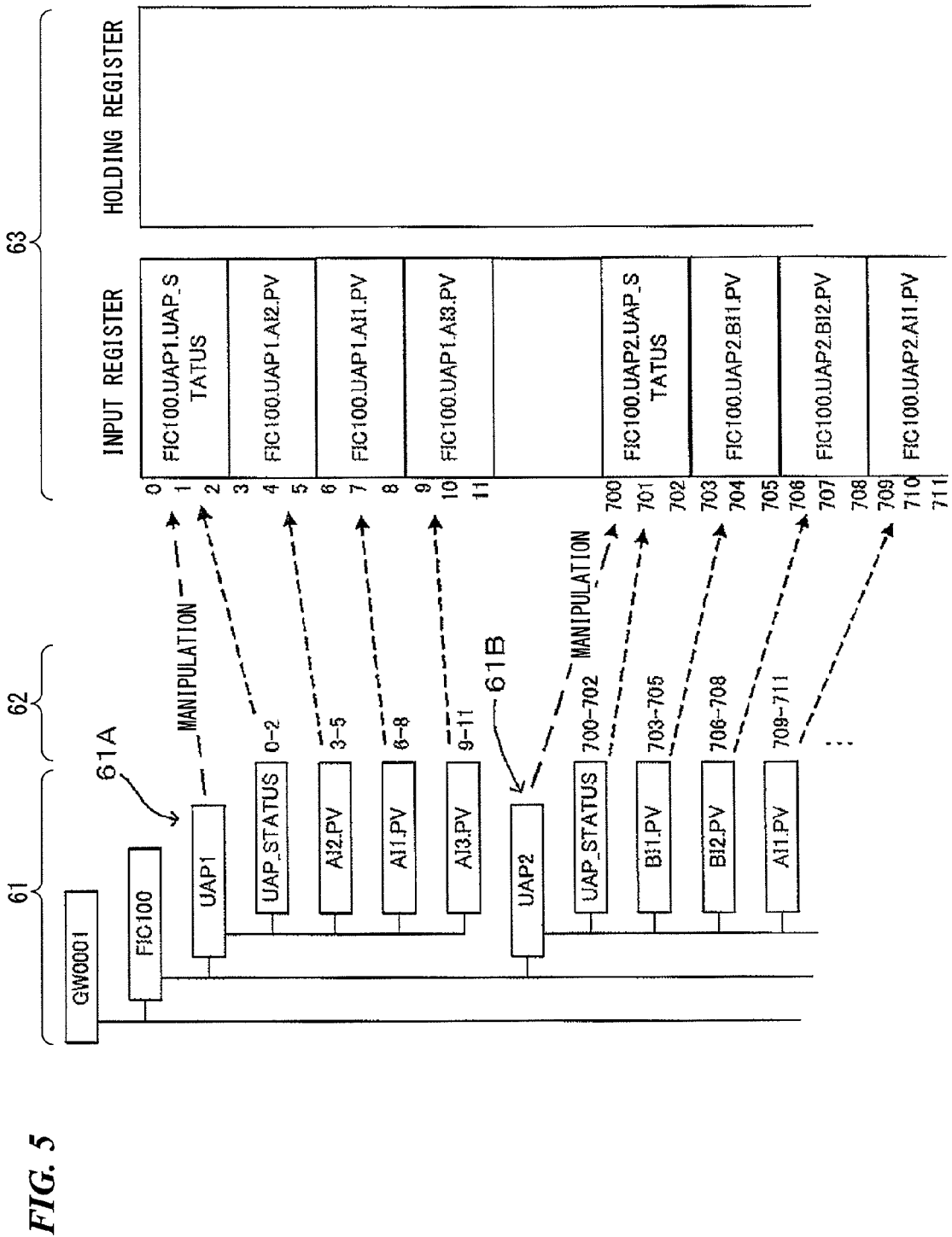
FIG. 5 is a view illustrating an example of a display in the screen of the register configurator when data is allocated as a unit of a UAP (user application) name.

FIG. 5 is a view illustrating an example of a display in the screen 6 of the register configurator 5 when the data is allocated as a unit of the UAP name.

As illustrated in FIG. 5, if a UAP name "UAP1" 61A in the display area 61 is selected and moved to an area neighbor to the area of the register number 1 in the input register by an operation of drag and drop, then all process data belonging to the UAP, "GW001.FIC100.UAP1.UAP_STATUS", "GW001.FIC100.UAP1.AI2_PV", . . . , and "GW001.FIC100.UAP1.AI3_PV", are allocated to the area of the register numbers 1 to 11 in the input register in series.

Similarly, if a UAP name "UAP2" 61B in the display area 61 is selected and moved to an area neighbor to the area of the register number 700 in the input register by an operation of drag and drop, then all process data belonging to the UAP, "GW001. FIC100.UAP2.UAP_STATUS", "GW001.FIC100.UAP2.BI1_PV", . . . , and "GW001.FIC100.UAP1.AI1_PV", are allocated to the area of the register numbers 700 to 708 in the input register in series.

The displays of the display area 63 and the display area 62 after the data is allocated are the same as the case of FIG. 4. After allocating of the data has finished, the definition file is generated based on the result of allocating of the data.

Figure 6:
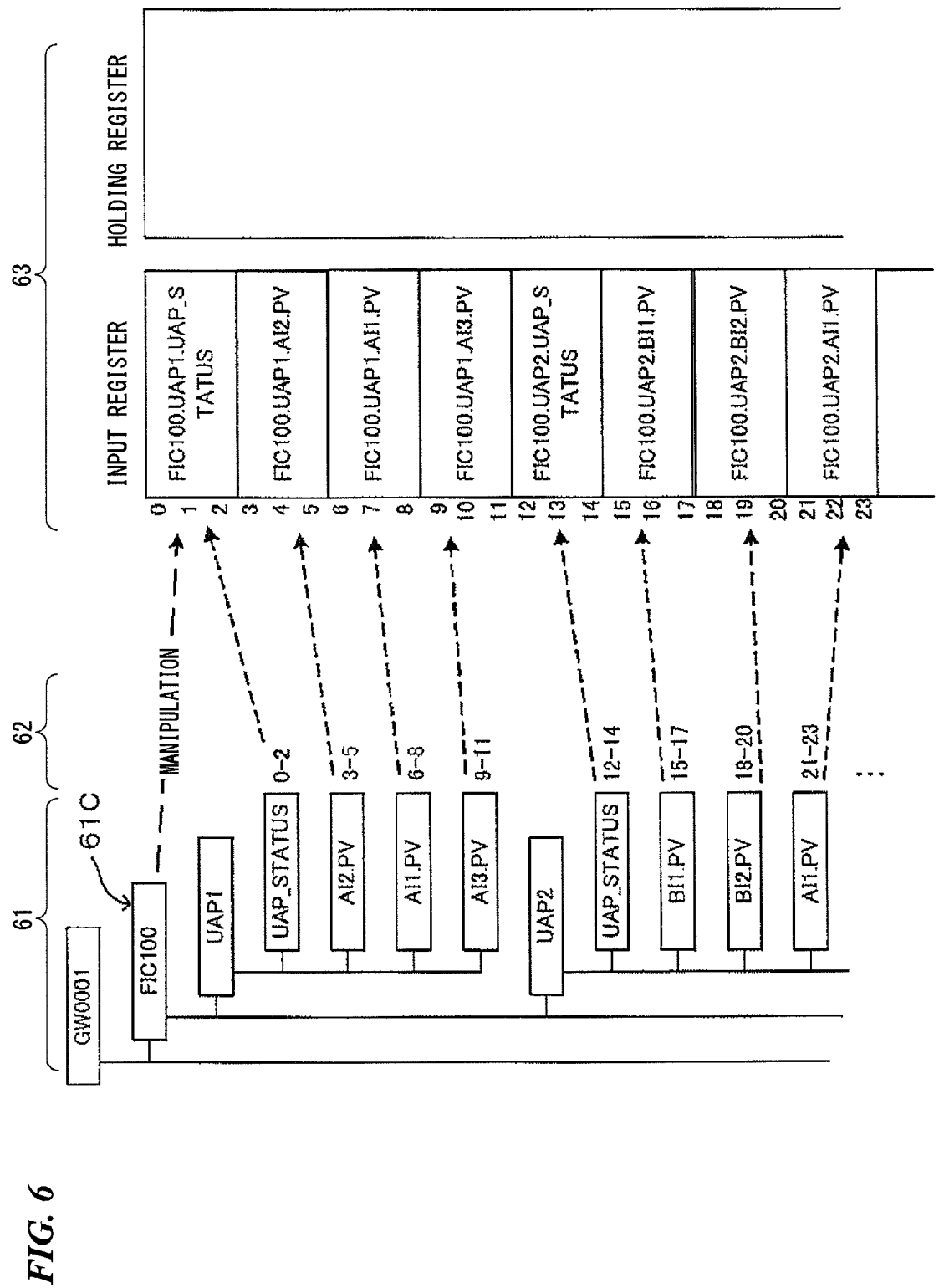
FIG. 6 is a diagram illustrating an example of a display in the screen of the register configurator when data is allocated as a unit of a field device name.

FIG. 6 is a diagram illustrating an example of a display in the screen 6 of the register configurator 5 when the data is allocated as a unit of the field device name.

As illustrated in FIG. 6, if a field device name "FIC100" 61C in the display area 61 is selected and moved to an area neighbor to the area of the register number 1 in the input register by an operation of drag and drop, then all process data belonging to the field device, "GW001.FIC100.UAP1.UAP_STATUS", "GW001.FIC100.UAP1.AI2_PV", . . . , are allocated to the area of the sregister number 1, 2, . . . in the input register in series.

The displays of the display area 63 and the display area 62 after the data is allocated are the same as the case of FIG. 4. After allocating of the data has finished, the definition file is generated based on the result of allocating of the data. As described above, operation is performed on a unit of upper items in the hierarchy structure, and all data belonging to the upper items can be allocated to the register space at a time. Thereby, operation of allocating of the data can be performed easily.

As described above, by the register configuration method in accordance with the first preferred embodiment of the present invention, the data can be allocated to the register space by an operation using the screen 6. Thereby, the data related to the field devices 11, 12 and 13 can be allocated to the Modbus register 23 efficiently. Also, the contents of the definition file can be displayed graphically. Thereby, when performing operations of debag and maintenance, status of allocating can be confirmed easily and errors are hard to occur. Thereby, an engineering cost can be reduced largely.

As described above, in the register configurator in accordance with the first preferred embodiment of the present invention, manipulation on the screen 6 is received so as to allocate each data to the area in the register space. The data is allocated to the area in the register space based on the received manipulation. Thereby, the burden for establishing correspondence between the data and the register space can be reduced.

The application range of the present invention is not limited to the above-described preferred embodiments. The present invention may be widely applied to a register configurator or a register configuration method that establishes correspondence between the data related to the field devices and the position where the data is stored in the register that updates the data.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A register configurator comprising:
   a display screen;
   a data display unit that displays data related to field devices on the display screen;
   a register space display unit that graphically displays a register space of a register on the display screen;
   a manipulation reception unit that receives a manipulation for allocating each of the data, which has been displayed by the data display unit, to an area in the register space, which has been displayed by the register space display unit, the manipulation being performed on the display screen by a user; and
   a correspondence establishing unit that establishes a correspondence between the data and the area, based on the manipulation that has been received by the manipulation reception unit, wherein the display screen comprises:
   a first display area where the data is displayed in a hierarchy structure, the hierarchy structure including a gateway name, a field device name, a UAP (user application) name, and a data name;
   a second display area where a register number is displayed, the register number corresponding to the area in the register space where the data is allocated; and
   a third display area where the register space is displayed graphically.

2. The register configurator according to claim 1, wherein the register space display unit displays the register space so that a first area in the register space where the data is allocated and a second area in the register space where the data is not allocated can be distinguished by the user.

3. The register configurator according to claim 1, further comprising:
   an allocation display unit that displays the area in the register space where the data is allocated based on the manipulation which has been received by the manipulation reception unit.

4. The register configurator according to claim 1, wherein the first display area is displayed by the data display unit, and the third display area is displayed by the register space display unit.

5. The register configurator according to claim 1, wherein the register space is displayed so that the manipulation can be performed on the display screen by a user's operation of drag and drop.

6. The register configurator according to claim 1, wherein the register space display unit displays a first area in the register space where the data is allocated by using a first color, the register space display unit displaying a second area in the register space where the data is not allocated by using a second color that is different from the first color.

7. The register configurator according to claim 1, wherein the correspondence between the data and the area is automatically listed into a text file after the data is allocated to the area in the register space.

8. The register configurator according to claim 7, wherein contents of the text file are displayed on the display screen so as to be edited by the user.

9. A field control system comprising:
   field devices;
   a gateway that performs a wireless communication with the field devices; and
   a client that communicates with the field devices through the gateway, the client being connected to the gateway through a bus,
   wherein the gateway comprises:
      a register that stores data related to the field devices; and
      a register configurator that controls the register,
   wherein the register configurator comprises:
      a display screen;
      a data display unit that displays the data related to the field devices on the display screen;
      a register space display unit that graphically displays a register space of the register on the display screen;
      a manipulation reception unit that receives a manipulation for allocating each of the data, which has been displayed by the data display unit, to an area in the register space, which has been displayed by the register space display unit, the manipulation being performed on the display screen by a user; and
      a correspondence establishing unit that establishes a correspondence between the data and the area, based on the manipulation that has been received by the manipulation reception unit, and
   wherein the display screen comprises:
      a first display area where the data is displayed in a hierarchy structure, the hierarchy structure including a gateway name, a field device name, a UAP (user application) name, and a data name;
      a second display area where a register number is displayed, the register number corresponding to the area in the register space where the data is allocated; and
      a third display area where the register space is displayed graphically.

10. The field control system according to claim 9, wherein the register space display unit displays the register space so that a first area in the register space where the data is allocated and a second area in the register space where the data is not allocated can be distinguished by the user.

11. The field control system according to claim 9, wherein the register configurator further comprises:
an allocation display unit that displays the area in the register space where the data is allocated by the manipulation received by the manipulation reception unit.

12. A register configuration method comprising:
displaying data related to field devices on a display screen;
graphically displaying a register space of a register on the display screen;
receiving a manipulation for allocating each of the data, which has been displayed on the display screen, to an area in the register space, which has been displayed on the display screen, the manipulation being performed on the display screen by a user;
establishing a correspondence between the data and the area, based on the manipulation that has been received;
displaying the data on the display screen in a hierarchy structure, the hierarchy structure including a gateway name, a field device name, a UAP (user application) name, and a data name; and
displaying a register number on the display screen, the register number corresponding to the area in the register space where the data is allocated.

13. The register configuration method according to claim 12, wherein the manipulation is performed on the display screen by a user's operation of drag and drop.

14. The register configuration method according to claim 12, further comprising:
displaying a first area in the register space where the data is allocated by using a first color; and
displaying a second area in the register space where the data is not allocated by using a second color that is different from the first color.

15. The register configuration method according to claim 12, further comprising:
automatically listing the correspondence between the data and the area into a text file after the data is allocated to the area in the register space.

16. The register configuration method according to claim 15, further comprising:
displaying contents of the text file on the display screen so as to be edited by the user.

17. The register configuration method according to claim 12, further comprising:
displaying the register space so that a first area in the register space where the data is allocated and a second area in the register space where the data is not allocated can be distinguished by the user.

18. The register configuration method according to claim 12, further comprising:
displaying the area in the register space where the data has been allocated based on the manipulation that has been received.

* * * * *